Patented Oct. 23, 1923.

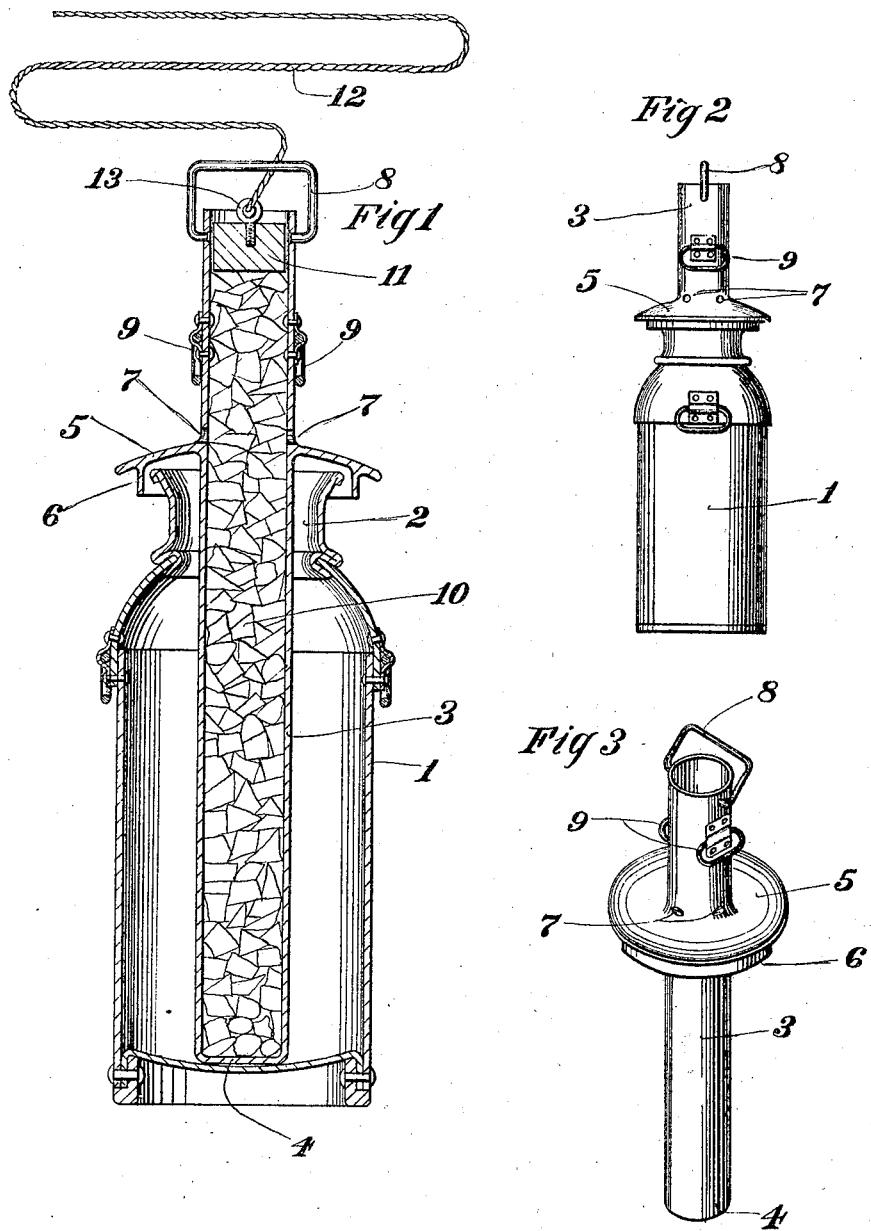

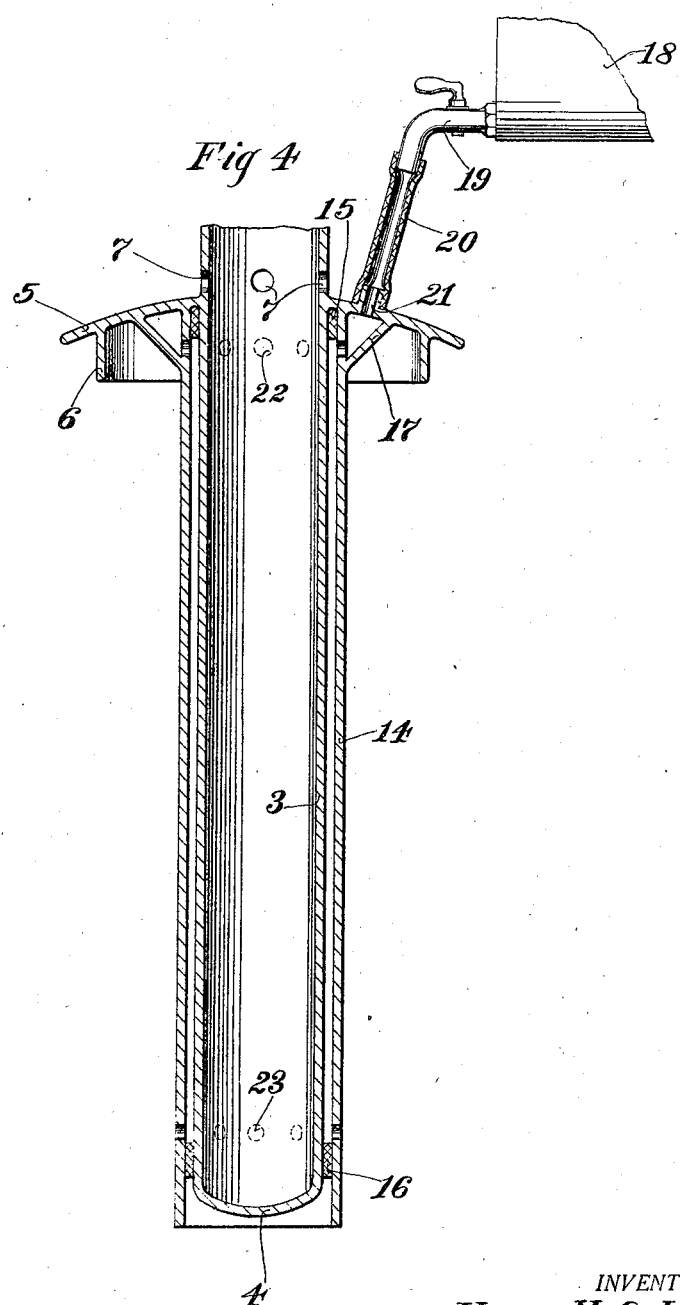

1,471,449

UNITED STATES PATENT OFFICE.

MOSES M. CAHILL, OF LITCHFIELD, CONNECTICUT.

RAPID MILK COOLER.

Application filed September 21, 1922. Serial No. 589,610.

*To all whom it may concern:*

Be it known that I, MOSES M. CAHILL, a citizen of the United States, and a resident of Litchfield, county of Litchfield, and State of Connecticut, have invented certain new and useful Improvements in Rapid Milk Coolers, of which the following is a specification.

This invention relates to coolers for liquids and other fluid materials, and more particularly to a cooler adapted to contain a cooling medium, and to be inserted downwardly into a can or other receptacle containing the material to be cooled.

One object of the invention is to provide a cooler of the type stated comprising an elongated tube especially adapted for cooling milk, and having a collar on the tube, to provide a cover for a milk-can.

A further object is to provide a cooler of the above nature in which perforations are provided in the tube above the collar, for permitting the overflow of the spent cooling medium.

A still further object of the invention is to provide a cooler of the above type adapted to receive ice as a cooling medium and having means, such as a weight, adapted to slide downwardly within the tube to force the ice to the bottom of the tube whereby the greatest cooling efficiency is attained.

A further object is to provide a device of the above nature which will be simple, cheap to manufacture, and very efficient and durable in use.

With these and other objects in view, there are illustrated in the accompanying drawing, several forms in which the invention may be conveniently embodied in practice.

Fig. 1 is a vertical sectional view through an ordinary milk-can having the improved cooler inserted therein, the cooler also being shown in section.

Fig. 2 is an elevation, on a reduced scale, of the can and cooler shown in Fig. 1.

Fig. 3 is a perspective view of the cooler also shown on a reduced scale.

Fig. 4 is a sectional view of a modified form of cooler, showing a storage tank connected thereto.

It is well known that in milk dairies it is the usual practice to cool the milk as quickly as possible after taking the same from the animal. This practice assists materially in preventing the formation of bacteria, thereby enhancing the market value, and improving the nutritive, healthful, and keeping qualities of the milk. In large dairies, this cooling process is usually performed in expensive aerators whereby the milk is passed over cold pipes containing a cooling medium. Such devices, however, are too expensive and complicated to be practical for use in small dairies. In such small dairies, the milk is ordinarily cooled by placing the milk cans in large tanks of ice water. This method of cooling, however, is quite slow, and, under ordinary conditions, it usually requires an hour or more of time during which the bacteria in the milk are allowed to multiply considerably.

The present invention comprises a device which is adapted to be readily inserted within an ordinary can of milk, and whereby the milk may be cooled from the inside.

In the drawings, in which like reference characters denote corresponding parts throughout the several views, the numeral 1 indicates an ordinary milk-can adapted to contain milk to be cooled. The mouth portion 2 of the can is constricted in form and adapted to receive a cover in the usual manner. The construction of the can comprises no part of the invention and therefore will not be further described herein.

The first embodiment of the improved cooler, as illustrated in Figs. 1 to 3, comprises an elongated tube 3 closed at its lower end 4, and open at its upper end.

The tube 3 is preferably made of such a length that it may rest upon the bottom of the can, as shown in Fig. 1. The tube 3 is provided adjacent its upper end with a collar or flange 5 which constitutes a cover for the mouth portion 2 of the can. The location of this collar 5 on the tube is preferably such as to leave a vent space between the collar and the top of the can, as illustrated. The collar 5 is also preferably provided with a circular protecting flange 6 extending downwardly therefrom about the mouth portion 2 of the can, whereby the milk is fully protected from contamination while being cooled.

A series of drain holes or perforations 7 (four in this instance) are preferably formed in the tube 3 above the collar 5 in order to provide an outlet for the spent cooling medium, as will be hereinafter more fully described. A top bail handle 8 and a pair of intermediate opposed handles 9 may be pivotally attached to the tube 3 to facilitate the manipulation thereof.

The tube 3 is adapted to contain a cooling medium of any convenient kind, such for example as cold water, cold brine, cracked ice, or a mixture of ice and salt. In the drawing, the cooling medium is illustrated as comprising cracked ice 10. To obtain the highest cooling efficiency, it is essential that this ice extend the entire length of the tube 3, which is in contact with the milk. For this purpose, a cylindrical metal weight 11 is provided which loosely fits within the interior of the tube, as illustrated. The weight 11 is adapted to rest upon the top of the column of ice 10, and as the ice melts continuously forces it to the bottom of the tube 3. The weight 11 may be conveniently lifted from the tube by a cord 12 connected to a screw eye 13 secured to the top of the weight.

In operation, the tube is first filled with cracked ice, and cold water is then added to fill the tube to the level of the drain holes 7. It will thus be evident that as the ice in the tube melts, the water will overflow through the drain holes 7, and pass down over the collar 5 and from thence to the outside of the can—the collar 5 and flange 6 preventing it from entering the interior of the can and diluting or contaminating the milk. When the tube is filled with ice, the weight 11 is placed in position upon the top of the column of ice, as illustrated in Fig. 1, whereby the ice, as it melts, is at all times forced downwardly into the bottom of the tube.

In the second embodiment of the invention illustrated in Fig. 4, an outer tube 14 is provided, which is preferably made integral with the collar 5 and is spaced slightly from inner tube 3 by means of metal spacing rings 15 and 16. As will be clear from the drawing, the outer tube 14 is also connected to the collar 5 by the funnel-shaped member 17, and preferably extends from the collar 5 to a point slightly below the base 4 of the inner tube. The outer tube 14 is provided with two sets of perforations 22 and 23—eight in this instance—one set just below the spacing ring 15, and the other set just above the spacing ring 16.

In operation, a liquid which it is desired to cool, such as milk, is delivered from a suitable storage tank 18 through a control valve 19 to a rubber hose 20 which is connected to an upstanding tube 21 integral with the collar 5. The tube 21 leads the milk into the space between the funnel 17 and the outer tube 14, from which it descends by gravity and the pressure of the milk above it into the narrow passage between the tubes 3 and 14. After passing down the entire length of this narrow passage, and being quickly chilled by reason of the large cooling surface of such passage, the milk passes through the perforations 23 and enters the main part of the milk-can.

In the use of the second embodiment of the invention just described, the valve 19 may be so adjusted as to maintain a slow stream of liquid flowing through the cooler so that the most efficient cooling action will be obtained. It will be understood that instead of delivering the milk or other liquid from the storage tank 18, it may be poured directly into the cooler through the tube 20 from a milk pail, milk can, or other container.

It will also be understood that after the milk has been cooled in the narrow passage between the tubes of the cooler shown in Fig. 4, it will be further cooled in the outer chamber of the can in exactly the same manner as in the form of milk-can shown in Figs. 1 to 3.

It should be noted that the device comprising this invention is simple, inexpensive, easily cleaned, and is adapted to perform the objects of the invention with great facility. In practice it has been found that milk may be cooled by the use of this invention in but one-fourth the time required by the usual and ordinary method.

It will be understood that if desired, the present interior cooling tube may be utilized in addition to the exterior cooling means generally used, or it may be employed as the sole cooling medium. In either case, the cooling process will be rapid, and the bacteria content will be readily kept below the prescribed maximum.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. A cooler for liquids or other materials comprising the combination of a tube adapted to contain a cooling medium and to be inserted downwardly into a can or other open receptacle containing material to be cooled, and a cover in the form of a collar carried by said tube intermediate its ends adapted to extend over the opening in the can or other receptacle.

2. A cooler for liquids or other materials, comprising the combination of a tube adapted to contain a cooling medium and to be inserted downwardly into a can or other open receptacle containing the material to be cooled, and a collar on said tube adapted to extend over the opening in the can or other receptacle to provide a cover therefor, said tube being perforated above the collar to provide an outlet for spent cooling medium.

3. A cooler for liquids or other materials comprising the combination of a tube adapted to contain a cooling medium and to be inserted downwardly into a can or other open receptacle containing the material to be cooled, a collar on said tube adapted to extend over the opening in the can or other receptacle to provide a cover therefor, said tube being perforated above the collar to provide an outlet for spent cooling medium, said collar having a downwardly extending flange adapted to surround the opening in the can or other receptacle to prevent the overflowing spent cooling medium from entering the can.

4. A cooler for liquids or other materials comprising the combination of a tube adapted to contain ice as a cooling medium and to be inserted downwardly into a can or other receptacle containing the material to be cooled, a collar on said tube adapted to extend over the opening in the can or other receptacle to provide a cover therefor, and means located within the tube and adapted to move downwardly therein to force the ice to the bottom of the tube, the melted ice being permitted to escape upwardly past said means.

5. A cooler for liquids or other materials comprising the combination of a tube adapted to contain ice as a cooling medium and to be inserted downwardly into a can or other receptacle containing the material to be cooled, a collar on said tube adapted to extend over the opening in the can to provide a cover therefor, and a weight fitting the inside of said tube and adapted to be lowered thereinto to force the ice to the bottom of the tube, the melted ice being permitted to flow upwardly past said weight, the tube being perforated above the collar to provide an outlet for the melted ice.

6. A quick-cooling device for milk-cans comprising the combination with a milk-can adapted to contain milk, of a tube adapted to contain a cooling medium, said tube having a collar intermediate its ends adapted to cover the open mouth of the milk-can to prevent the cooling medium from falling into the can.

7. A quick-cooling attachment for milk-cans comprising a tube adapted to contain a cooling mixture including cracked ice, said tube being adapted to be inserted downwardly into a milk-can, means for pressing said cracked ice against the bottom of the tube, and means for draining the melted ice from said tube.

8. A quick-cooling device for milk-cans comprising a tube adapted to contain a cooling medium, said tube having a collar intermediate its ends and so located on the tube that an air vent is left between the mouth of the milk-can and the collar, when the tube is resting on the base of the milk-can.

9. A quick-cooling attachment for a liquid comprising an inner receptacle closed at the bottom and adapted to contain a cooling medium, said attachment being adapted to be inserted within a milk-can, an outer tube, means for partially cooling said liquid by passing it through the passage between said tubes, the cooling of said liquid being completed in the outer chamber of the can.

10. A quick-cooling attachment for a perishable liquid comprising an inner tube adapted to contain cooling means, a collar secured to said inner tube, an outer tube depending from said collar, a funnel-shaped flange connecting said outer tube with said collar, and means for causing said liquid to flow into the space between said tube, flange, and collar, into the passage between said tubes, and out of said passage near the bottom thereof.

11. A quick-cooling device comprising a milk can, a tube adapted to contain a cooling medium extended within said milk-can, said tube having an outer jacket spaced therefrom, means for causing a stream of milk to flow between said jacket and tube to be cooled by the cooling medium within said tube, and a flange surrounding said tube to form a cover for said milk-can.

12. In a milk-can, a tube within said milk-can containing a cooling medium, a jacket surrounding said tube and forming a jacket space, said jacket space having an inlet at one end communicating with the outside of said can, and an outlet at its other end communicating with the inside of said can.

In testimony whereof, I have affixed my signature to this specification.

MOSES M. CAHILL.